United States Patent

Hishida

Patent Number: 5,197,351
Date of Patent: Mar. 30, 1993

[54] CAM SHAFT AND PROCESS FOR MANUFACTURING THE SAME

[75] Inventor: Tadashi Hishida, Sakai, Japan

[73] Assignee: Viv Engineering Inc., Osaka, Japan

[21] Appl. No.: 861,455

[22] Filed: Apr. 1, 1992

Related U.S. Application Data

[60] Division of Ser. No. 708,066, May 30, 1991, Pat. No. 5,136,780, which is a continuation-in-part of Ser. No. 561,506, Jul. 30, 1990, abandoned.

[30] Foreign Application Priority Data

Feb. 28, 1989 [JP] Japan .................................. 1-49359

[51] Int. Cl.⁵ ...................... F01L 1/04; F16H 53/00
[52] U.S. Cl. ....................... 74/567; 29/888.1; 123/90.6
[58] Field of Search ............ 29/888.1, 458; 74/567, 74/568 R; 219/121.17, 121.38, 121.66; 419/8; 123/90.6

[56] References Cited

U.S. PATENT DOCUMENTS

| | | | |
|---|---|---|---|
| 3,999,277 | 12/1976 | Hamada | 29/888.1 |
| 4,595,556 | 6/1986 | Umeha et al. | 419/8 |
| 4,774,852 | 10/1988 | Matt | 74/567 |
| 4,781,075 | 11/1988 | Yamaji et al. | 74/567 |
| 4,783,898 | 11/1988 | Kanamaru | 419/8 X |
| 4,809,562 | 3/1989 | Bendoraitas et al. | 74/567 |
| 4,899,615 | 2/1990 | Matt | 74/567 |
| 4,922,785 | 5/1990 | Arnold et al. | 74/567 |
| 4,947,547 | 8/1990 | Matt | 29/888.1 |
| 4,983,797 | 1/1991 | McAllister et al. | 29/888.1 |
| 5,007,165 | 4/1991 | Podhorsky | 29/888.1 |
| 5,044,224 | 9/1991 | Hiraoka et al. | 74/567 |

FOREIGN PATENT DOCUMENTS

| | | | |
|---|---|---|---|
| 0340128 | 11/1989 | European Pat. Off. | 74/567 |
| 57-16090 | 1/1982 | Japan | 74/567 |
| 60-190501 | 9/1985 | Japan | 29/888.1 |
| 61-202771 | 9/1986 | Japan | 29/888.1 |
| 2121908 | 1/1984 | United Kingdom | 74/567 |
| 2167524 | 5/1984 | United Kingdom | 74/567 |

Primary Examiner—Vinh T. Luong
Attorney, Agent, or Firm—Wenderoth, Lind & Ponack

[57] ABSTRACT

A cam shaft having a shaft member made of steel and having on the outer periphery thereof an axial groove, and a cam and a gear made of a sintered alloy and mounted on the shaft member by engaging a protrusion on a cams and the gear in the axial groove. The shaft member is provided with plating layers of copper on the outer periphery thereof at portions where the gear and the cam are to be mounted. The gear and the cam are impregnated with copper the same as the plating layer. The contact portions are heated by a laser to fuse the copper to join the cam and the gear to the shaft member.

1 Claim, 1 Drawing Sheet

CAM SHAFT AND PROCESS FOR MANUFACTURING THE SAME

This is a divisional application of Ser. No. 07/708,066, filed May 30, 1991, now U.S. Pat. No. 5,136,780, which in turn is a continuation-in-part of Ser. No. 07/561,506, filed Jul. 30, 1990, now abandoned.

BACKGROUND OF THE INVENTION

This invention relates to a cam shaft used e.g. for driving intake valves and exhaust valves of an internal combustion engine and a process for manufacturing the same.

As a prior art cam shaft of this type, there is known one disclosed in Japanese Unexamined Utility Model Publication 57-16090.

This prior art cam shaft comprises a shaft member made of a ferrous material and cams made of a sintered alloy or a ceramic material. The cams are fitted on the shaft member and fixed thereto.

In this prior art, the cams are fixed to the shaft by integrally forming gears on the shaft member and at the same time by pouring a synthetic resin between the shaft and the cams.

The above-described prior art requires a mold or a forming machine for synthetic resin to integrally form a gear of synthetic resin on the outer periphery of the shaft member.

To increase the bonding force between the resin and the shaft member, it is necessary to form a resin layer over a substantially entire length of the shaft member. As a result, the diameter of the shaft member has to be reduced.

This reduces the rigidity of the shaft member. Thus if the cam shaft is small in size, problems concerning strength will arise.

SUMMARY OF THE INVENTION

It is an object of the present invention to provide a cam shaft which obviates the problems of the above-described prior art shaft and which has a sufficient strength for its desired use and can be produced at low cost.

It is another object of the present invention to provide a process for manufacturing a cam shaft which has a greater strength than prior art cam shafts.

In accordance with the present invention, there is provided a cam shaft comprising a shaft member made of steel and having on the outer periphery thereof an axial groove, and a cam or cams, and if desired a gear, made of a sintered alloy and having an axial hole to receive the shaft member and with a protrusion on the wall of the axial hole, the cam or cams and gear being mounted on the shaft member with the protrusion on the cam or cams and gear engaged in the axial groove in the shaft member, the shaft member being provided with a copper plating layer on the outer periphery thereof at joint areas where the cam or cams and gear are secured to the shaft member, the cam or cams and gear being impregnated with copper, the joint areas being heated to fuse the copper and the copper plating layer to join the cam or cams and gear to the shaft member.

According to this invention, because the gear and the cams are made of a sintered alloy, no machining is necessary. This simplifies the production steps and lowers the cost, while retaining sufficient strength and wear resistance.

A plating layer of copper is provided on the outer periphery of the shaft member at joint portions with the gear and the cams. The gear and the cams are impregnated with copper. After fitting the gear and the cams on the shaft member, the joint portions therebetween are heated locally by a laser to fuse and join them together. This makes it possible to join them firmly. Due to the groove-protrusion engagement, the gear and the cams are firmly joined to the shaft member with respect to the direction of rotation in spite of the fact that no key is used.

Other features and objects of the present invention will become apparent from the following description taken with reference to the accompanying drawings, in which:

DETAILED DESCRIPTION OF THE PREFERRED EMBODIMENT

Figure 1:
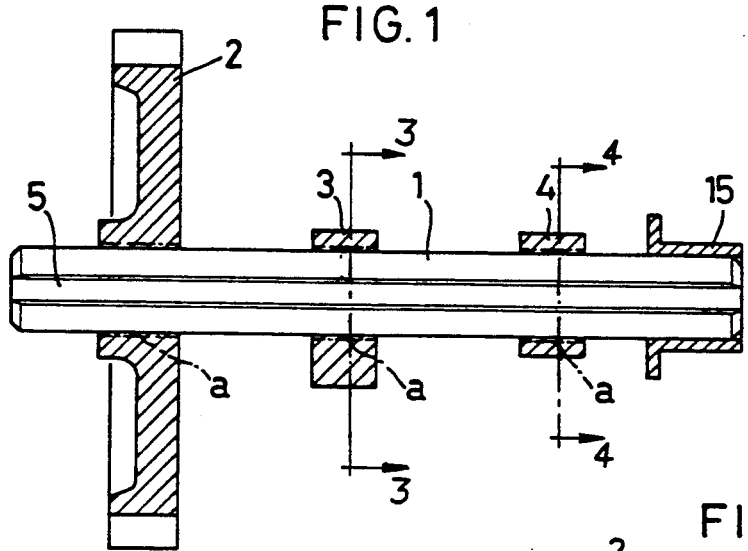
FIG. 1 is a vertical sectional side view, taken along lines 1—1 of FIG. 2, of a portion of the cam shaft according to this invention.
Figure 2:
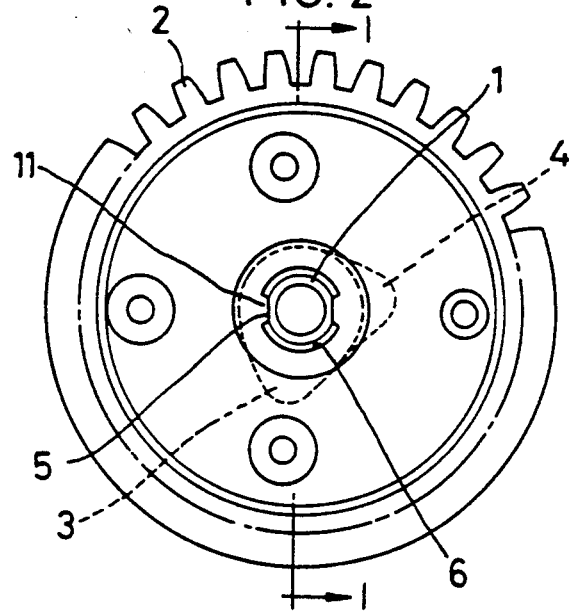
FIG. 2 is a front view of the same.

In the embodiment shown in the drawings, numeral 1 designates a shaft member. As the material for the shaft 1, a pipe made of a high-strength, wear-resistant steel such as S45C is used. Axial grooves 5 are formed in its outer periphery.

Gear 2 and cams 3 and 4 are made of a sintered alloy. The teeth of the gear and the cam surfaces should be finished to such an extent as not to require additional machining. Also, the gear 2 and the cams 3 and 4 should have their shaft holes 6-8 (to receive the shaft 1) and protrusions 11-13 (adapted to engage in the grooves 5 in the shaft 1) finished to such an extent as to require no additional machining.

A rather thick copper plating is provided on the outer periphery of the shaft 1 at portions where it is to have the gear 2 and the cams 3 and 4 mounted thereon. A plating removing agent should be applied to the shaft 1 at portions where it rest on bearing or at journal portions to keep these portions free of plating.

Figure 5:
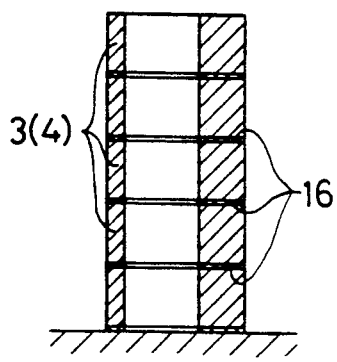
FIG. 5 is a sectional side view of the assembly consisting of the cams and the copper plates.
Figure 3:
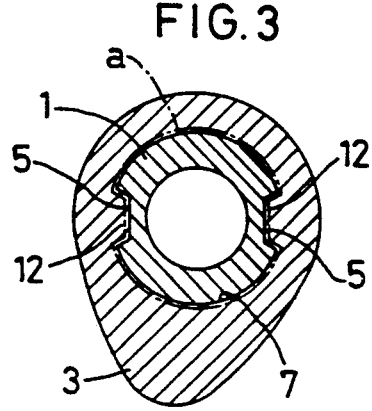
FIGS. 3 and 4 are enlarged cross-sectional views, taken along lines 3—3 and 4—4, respectively, of the cams fixed on the shaft member.
Figure 4:
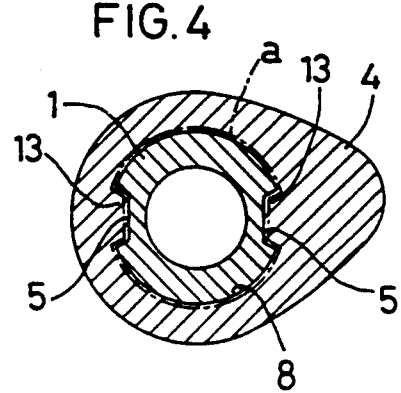

The impregnation with copper is carried out in the following manner. First, a plurality of cams 3, 4 and gears 2 are formed by pressing metallic powder. The cams 3 or 4 are put one upon another with copper plates 16 (containing a release agent and having a suitable thickness) sandwiched between the adjacent cams, as shown in FIG. 5. The copper plates should not protrude beyond the contour of the cams. Then they are placed in a furnace and heated for sintering and hardening. While being heated, the copper plates melt and copper impregnates into the cams. The gears 2 can be formed and impregnated with copper in the same manner as the cams. In this method, the profile of the cams and the surface roughness of the outer peripheral surface of the cams never change, so that regrinding of the cams is not required.

Air holes formed in the sintered material of the cams and the gears are filled with copper. This increases the wear resistance of the cams and gears. Also, this ensures that the cams and the gear are secured to the shaft member by fusing with a greater strength.

A gear 2 and cams 3 and 4 thus made are mounted on a shaft member 1 so that it will extend through their respective shaft holes 6–8. The gear 2 and the cams 3 and 4 are positioned in the correct position by engaging the protrusions 11–13 in the groove 5 in the shaft 1. With the parts in this state, the joint portions between the shaft 1 and the gear 2 and the cams 3 and 4 are locally heated by use of a high-frequency beam laser to melt by heat the plating layer on the surface of the shaft 1 and the copper impregnating the gear and the cams. The molten plating layer and copper will be fused together, forming a fuse-bonded layer a. Thus, the gear 2 and the cams 3 and 4 are secured fast to the shaft 1.

A bushing 15 shown in FIG. 1 is also made of a sintered alloy and is mounted on the shaft 1 at its end. It should be secured to the shaft in the same manner as the gear 2 and the cams 3 and 4.

What is claimed is:
1. A cam shaft comprising:
   a shaft member made of steel and having an axial groove on the outer periphery thereof; and
   a cam made of a sintered alloy and having an axial hole to receive said shaft member and having a protrusion on a wall defining said axial hole, said cam being mounted on said shaft member with said protrusion on said cam engaged in said axial groove in said shaft member, said shaft member being provided with a copper plating layer on the outer periphery thereof at a joint area where said cam is secured to said shaft member, said cam being impregnated with copper, said copper and said copper plating layer being heat fused to join said cam to said shaft member.

* * * * *